United States Patent [19]

Kronenberg

[11] Patent Number: 4,617,464
[45] Date of Patent: Oct. 14, 1986

[54] SAMPLING AND RECORDING DOSE RATE METER

[75] Inventor: Stanley Kronenberg, Skillman, N.J.

[73] Assignee: The United States of America as represented by the Secretary of the Army, Washington, D.C.

[21] Appl. No.: 597,305

[22] Filed: Apr. 6, 1984

[51] Int. Cl.$^4$ .............................................. H01J 39/29
[52] U.S. Cl. ..................................... 250/377; 250/376; 250/385 R
[58] Field of Search ................... 250/374, 377, 385 R, 250/376; 324/457, 458, 123 R, 114

[56] References Cited

U.S. PATENT DOCUMENTS

| | | | |
|---|---|---|---|
| 2,756,348 | 7/1956 | Schneider | 250/385 |
| 4,281,250 | 7/1981 | Kronenberg et al. | 250/377 |
| 4,449,049 | 5/1984 | Manning | 250/377 |

*Primary Examiner*—Carolyn E. Fields
*Assistant Examiner*—Richard Hanig
*Attorney, Agent, or Firm*—Anthony T. Lane; Jeremiah G. Murray; John T. Rehberg

[57] ABSTRACT

A wide range radiation dose rate meter for civil defense use, including a Geiger-Mueller tube used in a continuous counting mode and for measuring dose rates from the natural background to about 30 rads/hr., with an ion chamber arranged to measure higher dose rates up to 10,000 rads/hr. The instrument has a sample and record capability in which the selected radiation detector will have its output connected to a selected storage capacitor for a precise interval of time determined by a timing circuit and the storage capacitor will accumulate and hold a voltage proportional to the dose rate, which can be read by means of an electrometer at a later time. The instrument has a self contained hand cranked power supply and all components are selected for long shelf life.

7 Claims, 8 Drawing Figures

SAMPLING AND RECORDING DOSE RATE METER

The invention described herein may be manufactured, used and licensed by or for the Government for governmental purposes without the payment to me of any royalties thereon.

BACKGROUND OF THE INVENTION

This invention relates to a dose rate meter intended for providing reliable and accurate measurements of ionization radiation dose rates in cases of nuclear emergencies such as reactor accidents, spillages of radioactive materials or a nuclear war. This instrument is intended for civil defense use and accordingly it must be capable of being stored for many years without servicing and must be available and operable instantly in cases of sudden need. Also, devices of this type should be easy to operate since most of them will be used by unskilled personnel often under the emotional stress of a real or imagined nuclear disaster.

The operation of this dose rate meter does not depend on any external power sources which would not be reliable in emergencies nor on batteries which have limited shelf life and hence require periodic replacement. The other components must be simple, durable and be unaffected by prolonged storage.

The dose rate range of this instrument is extremely wide, extending from background rates (or approximately 0.01 millirads/hr.) to 10,000 rads/hr. The high sensitivity capability is important for civil defense applications to let the user know that no radiation danger is present. In the case of an accident, for example a chemical explosion in the vicinity of a nuclear reactor, the suspicion that nuclear radiation may be present could cause panic. This instrument can be used in such a situation to put these fears to rest.

The meter of the present invention has a sampling and recording capability. This means that it can measure and preserve the reading of an ambient radiation dose rate, and the dose rate can be later read, for example in the safety of a shelter. The meter can provide successive samplings within short time intervals.

SUMMARY OF THE INVENTION

An illustrative example of the instrument consists of a metal box with two selector switches mounted on one side thereof. These switches are a 10 position dose rate range selector switch and a three position operation mode selection switch. The readout indicator is a quartz or carbon fiber electrometer with a suppressed zero scale and internal illumination to permit reading in darkness. A handle extends from the bottom of the metal box and the cranking lever of a manually operable generator is arranged more or less parallel to the handle so that both can be grasped with one hand and squeezed to crank the generator.

The radiation detector is a hybrid type which includes both a Geiger-Mueller (GM) tube, functioning as a charge transport device and an ion chamber with the GM tube mounted within the ion chamber with the outside of the GM tube forming one of the ion chamber electrodes. The three modes of operation of this instrument include a continuous counting mode in which the device measures extremely low dose down to the natural background rates by applying each of the counts or pulses from the GM tube to the electrometer where they can be individually observed and the observed rate thereof is an indication of the dose rate. The second mode of operation is a high sensitivity sampling and recording mode in which the electric charge output of the GM tube is applied to one of a number of capacitors for a fixed interval of time, and the electrometer measures the voltage accumulated on the capacitor to indicate the dose rate. The third mode of operation is the low sensitivity mode wherein the ion chamber is used as the radiation detector instead of the GM tube and the ion chamber output is applied for the same fixed interval of time to one of several different storage capacitors, and the electrometer measures the stored voltage which is proportional to dose rate. The number of sample and record ranges is equal to the number of the storage capacitors which can be connected to either the GM tube or the ion chamber. The combination of these two radiation detectors in a single instrument provides the extremely wide dynamic range.

The output of the hand cranked generator is transformed up in voltage and is then connected to a pair of voltage doubling rectifier circuits which produce Zener diode stabilized voltages for operating the radiation detectors and the timing circuit which in the illustrative example comprises a reed relay. A stabilized voltage of 500 volts is provided for the radiation detector and this voltage is developed across a large filter capacitor which is large enough so that the high voltage remains sensibly constant during the sampling period determined by the reed relay.

It is thus an object of the invention to provide a dosimeter for civil defense purposes with a large dynamic range of from background radiation to approximately 10,000 rads/hr. utilizing a hybrid radiation detector including a GM tube operating as a charge transport device for measuring radiation dose rates below 30 rads/hr. and an ion chamber for measuring rates above 30 rads/hr. and wherein said GM tube is located inside of said ion chamber so that the outer electrode thereof can function as the collector electrode of the ion chamber, and wherein a quartz or carbon fiber electrometer is used to measure the voltage across one of several storage capacitors which can be switched in parallel with said electrometer to accumulate charge from said radiation detectors during a fixed period of time, whereby the electrometer reading will be proportional to dose rate.

Another object of the invention is to provide a highly reliable and accurate dose rate meter of the sample and record type which includes a highly reliable and accurate self-contained power source and which can provide dose rate reading from background levels to approximately 10,000 rads/hr. using a hybrid radiation detector comprising an ion chamber and a GM tube operating in the charge transport mode, with the GM tube mounted inside of said ion chamber, said dose rate meter having a continuous counting mode and a high sensitivity sampling and recording mode both utilizing said GM tube as the radiation detector and a low sensitivity mode utilizing said ion chamber as the radiation detector.

These and other objects and advantages of the invention will become apparent from the following detailed description and the drawings.

DETAILED DESCRIPTION OF A PREFERRED EMBODIMENT

Figure 1:
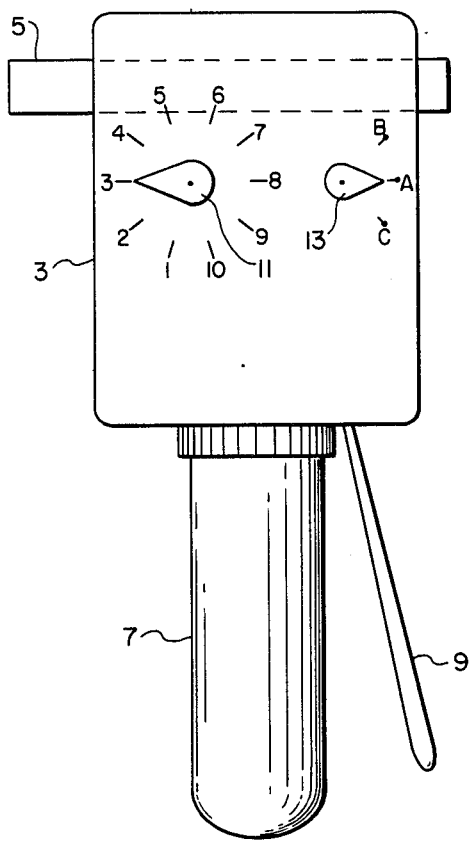
FIG. 1 is an external view of a dose rate meter incorporating the features of the present invention.

The apparatus of FIG. 1 comprises a generally rectangular metal box 3 with a 10 position range switch 11 and a three position mode selection switch 13 mounted on one side thereof. The box 3 should be hermetically sealed. Readout is accomplished by means of a quartz or carbon fiber electrometer mounted within tube 5 which has suitable optics associated therewith and also a light emitting diode (LED) for permitting reading in darkness. The instrument has a handle 7 attached to the underside of the metal box and a lever 9 for cranking the internal generator. One energetic squeeze of the lever 9 with the switch 13 in the A or charge position is sufficient to charge up the internal power supply and permit operation of the device. In this charge mode the instrument is at its highest sensitivity regardless of the setting of the dose rate range switch 11 and the GM tube is functioning in a continuous counting mode. On looking through the electrometer tube 5, low ambient dose rates such as background radiation will cause pulsing of the electrometer hairline with each count or pulse passing through the GM tube. The dose rate can be estimated by counting the number of such pulses per unit time. One pulse per second equals one millirad per hour. Normal background radiation will produce 1 pulse per 100 seconds, approximately, depending on location. Dose rates up to 10 millirads/hr. can be estimated in this charge mode.

The other two modes of operation, represented by mode selection switch positions B and C are respectively the low and high sensitivity sampling and recording modes. The high sensitivity mode uses the GM tube as a charge transport device to measure dose rates from 10 millirads/hr. to 30 rads/hr., and the low sensitivity mode uses the 160 cc ion chamber as the radiation detector for ranges from 30 to 10,000 rads/hr. In both cases the radiation detector selected by switch 13 will be connected by a timing circuit to one of a number of storage capacitors determined by the setting of range selector switch 11. Thus the selected capacitor will accumulate a charge and a voltage proportional to the radiation intensity multiplied by the time during which the timing circuit is closed. This voltage is proportional to the dose rate. The sampling and recording process requires less than 1 second and the recorded capacitor voltage remains substantially fixed for several minutes during which the instrument can be read at leisure. Thus the instrument can be taken outside of a shelter or even just held outside of a door or window thereof with the operator inside, the ambient radiation sampled, and the instrument read later in the safety of the shelter.

Figure 6:
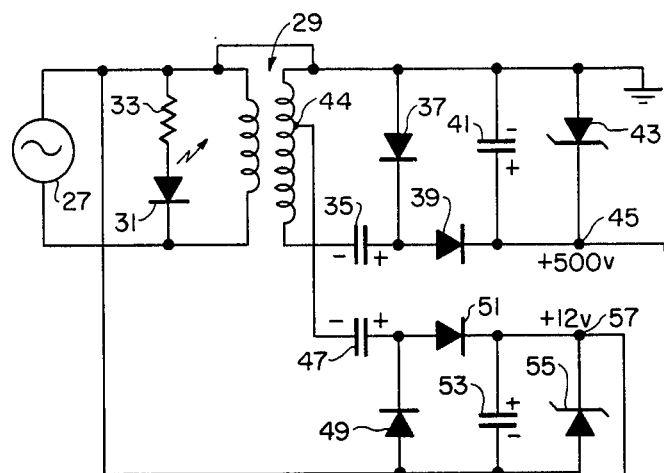
FIG. 6 is a circuit diagram of a dose rate meter built according to the teachings of the present invention.
Figure 6:
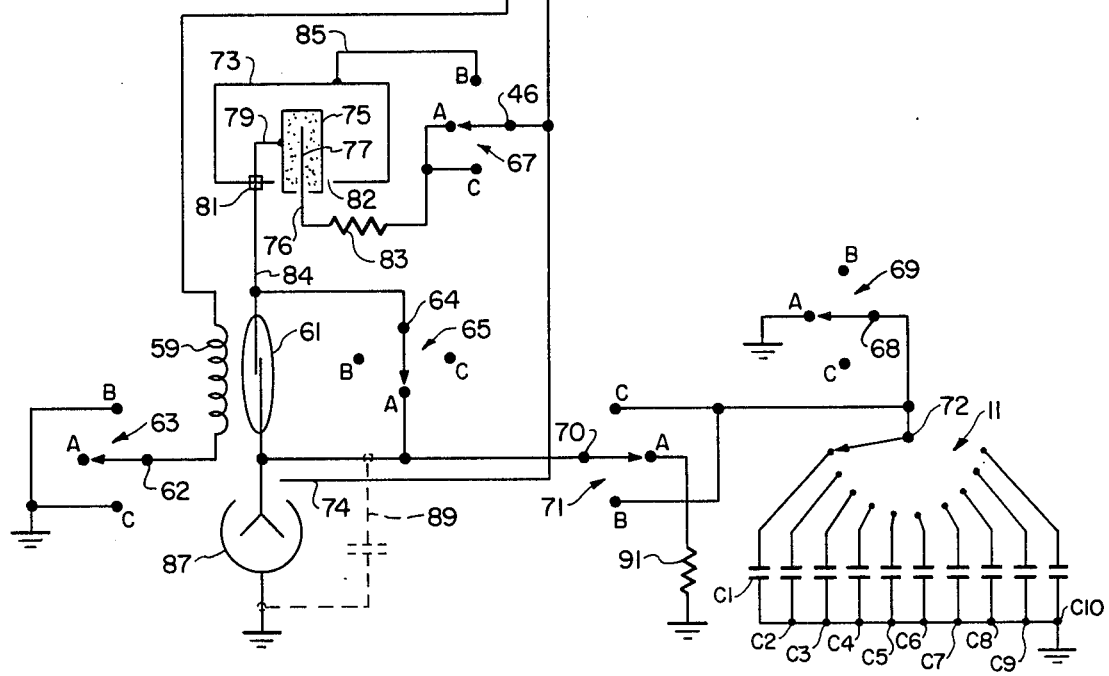

The circuit diagram of FIG. 6 includes the hand cranked generator 27 which has a nominal output of 3 volts at 250 Hz. The generator output is stepped up and applied to a low voltage rectifier circuit from tap 44 on the secondary of step-up transformer 29. The resistor 33 and LED 31 are connected across the generator and the LED is arranged to illuminate the electrometer readout. The secondary of step-up transformer 29 is applied to a voltage doubler circuit comprising capacitor 35, rectifier diodes 37 and 39 and filter capacitor 41, which has a capacity of 0.5 microfarads with a voltage rating of 600 volts. A Zener diode 43 connected across capacitor 41 regulates or limits the output voltage to 500 volts. In practice, 5 series-connected 100 volt Zener diodes may be required to achieve this voltage regulation. This high voltage is used to energize the radiation detectors. The low voltage power supply comprises a voltage doubler circuit comprising capacitor 47, connected to the aforementioned tap 44, rectifier diodes 49 and 51 and barium titanate filter capacitor 53 of 220 microfarads. The Zener diode 55 produces a regulated voltage of 12 volts at terminal 57. This low voltage is used to actuate the timing circuitry.

Figure 7:
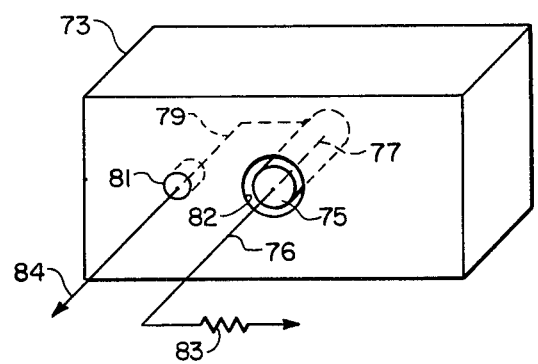
FIG. 7 shows details of the hybrid radiation detector used in the circuit of FIG. 6.

The hybrid radiation detector or detectors comprise the ion chamber 73, which in a prototype model of this instrument comprised a metal rectangular box with a volume of approximately 160 cc. The box used was a type usually used as a chassis for mounting electronic circuits. The miniature GM tube 75 is mounted within the ion chamber, as shown in the more detailed drawing of FIG. 7. The bottom of the ion chamber has a central hole 82 therein which is somewhat larger than the diameter of GM tube 75. The GM tube is supported inside the box 73 by a stiff wire 76 which also connects the center electrode 77 thereof to the resistor 83. With this arrangement, both detectors are immersed in the same radiation field, and the outer electrode of the GM tube can also function as the inner or collector electrode of the ion chamber.

The mode selector switch 13 of FIG. 1 comprises five separate ganged decks referenced in FIG. 6 as 63, 65, 67, 69, and 71, all operated by a common knob as shown in FIG. 1. Switch deck 67 has its terminal 46 connected to 500 volt terminal 45 and its B terminal to the outside electrode of the ion chamber via lead 85. Terminals A and C of this deck are both connected to the center or anode electrode 77 of the GM tube 75 through current limiting resistor 83 which may be 1.5 megohms. The GM tube is a miniature halogen type made by LND Corporation of Oceanside, N.Y. and is rated for 400-800 volts on the center electrode, is 0.2 inches in diameter and 1.0 inch long. Its dead time is 15 microseconds. This tube is not used as a counter tube but as a charge collector or transport device and thus the counting quality thereof is immaterial for this application. The outer electrode of the GM tube is connected to one of the contacts of a reed relay 61 via lead 79 which passes through feed-through insulator 81 in the wall of the ion chamber. The coil 59 is the operating coil of the reed relay, which in the prototype was a model CRZ-1062 "Clareed" relay made by C. P. Claire and Co. of Chicago, Ill.

The reed relay and the low voltage power supply comprise the timing circuit and the relay coil 59 is connected to 12 volt power supply terminal 57. The other end of coil 59 is connected to terminal 62 of mode selector switch deck 63. The A terminal of switch deck 63 is unconnected and the B and C terminals thereof are grounded. The switch deck 65 has its terminal 64 connected to the upper contact of the reed relay 61 and its A terminal to the lower contact thereof, with the other two terminals, B and C, unconnected. Thus in the A or charge mode the relay contacts are short circuited and the radiation detector connected directly to the electrometer 87. The dashed line capacity 89 represents the stray capacity of the electrometer. The terminal 70 of switch deck 71 is connected to the upper or fiber terminal of the electrometer, as shown, and the A terminal thereof is connected to electrometer bleeder resistor 91, which should be within an order of magnitude of $10^{10}$ ohms.

The terminals B and C of switch deck 71 are connected together and to terminal 68 of switch deck 69 and also to terminal 72 of range selector switch 11. Terminal A of deck 69 is grounded and terminals B and C thereof are unconnected. Ten range selection capacitors C1-C10 are connected to the terminals of range selector switch 11.

In operation, in the "charge" or continuous counting mode the mode selector switch 13 and all of its decks are in the A position. This connects the high voltage power supply to the center terminal of the GM tube via resistor 83 and connects the outer electrode of the GM tube via leads 79, 84 and switch deck 65 directly to the electrometer fiber. Also, in this mode the capacitors C1-C10 are shorted to ground via switch deck 69 and bleeder resistor 91 is across the electrometer and its stray capacitor 89. In this mode, a single radiation-induced pulse from the GM tube will rapidly charge up the small stray capacity 89, causing a deflection of the electrometer fiber. The voltage on capacity 89 will be discharged through bleeder resistor 91 within 0.1 second. As stated above, these radiation events can be counted by the observer to estimate dose rates. Only a tiny fraction of the charge on filter capacitor 41 of the high voltage supply is used for each count or pulse put out by the GM tube, thus one squeeze of the generator hand lever will maintain this voltage substantially constant for many thousands of counts. If necessary, the generator lever can be gently squeezed continuously to provide illumination of the electrometer scale by LED 31.

Some of the storage capacitors C1-C10 are associated with the low sensitivity mode which utilizes the ion chamber as the radiation detector and the remainder with the high sensitivity sample and record mode utilizing the GM tube. Each of the different storage capacitors would represent a different range within either the low or high sensitivity modes. Thus to measure radiation dose rates in the high sensitivity mode, one of the capacitors C1-C10 associated with this mode is selected by switch 11, the mode selection switch is set to its A or charge position and the power supply charged by squeezing lever 9. The instrument is then brought to the place where the radiation is to be measured and the mode selector switch turned to its C position. This applies the high voltage to GM tube 75, relay contacts 61, electrometer 87 and the selected storage capacitor. It also applies the low voltage to relay coil 59 which closes contacts 61 for a precise interval, which with the circuitry described is 0.61 seconds. Thus for this period of time the storage capacitor is connected to the output of the GM tube and will accumulate a voltage which is directly proportional to the electrical charge, Q, put out by the GM tube during this time, and inversely proportional to the capacity, C, of the storage capacitor selected by switch 11. The charge Q is proportional to the dose rate caused by the ambient radiation field.

To measure dose rates above 30 rads/hr. the instrument is again charged with the mode selector on position A, then this switch is turned to the B position after an appropriate capacitor has been selected by switch 11. As can be seen from the circuit diagram, this will apply the 500 volts to the outside of the ion chamber via lead 85. The inner or collector ion chamber electrode which is the outer GM electrode will then be applied to the electrometer and the selected storage capacitor through lead 79 and the relay contacts just as was the GM tube. The contacts 61 will be closed for the same amount of time, 0.61 seconds, which is determined by the time it takes to discharge the filter capacitor 53 in the low voltage power supply through the relay coil 59. The small output of the ion chamber compared to the GM tube requires that the storage capacitors used with the ion chamber be much smaller than those associated with the GM tube output, since they must be capable of charging to the full-scale voltage of the electrometer with the smaller ion chamber charge outputs.

When switching from the charge or A mode to either the B or C modes, the switches must be arranged to apply the high voltage to the selected radiation detector just before the reed relay contacts close.

While the mode selector switch has been illustrated as having five separate decks each with one pole and three stationary terminals, A, B and C, in practice a two deck ganged switch could be used with three moveable poles and nine stationary terminals on each deck.

Figure 2:
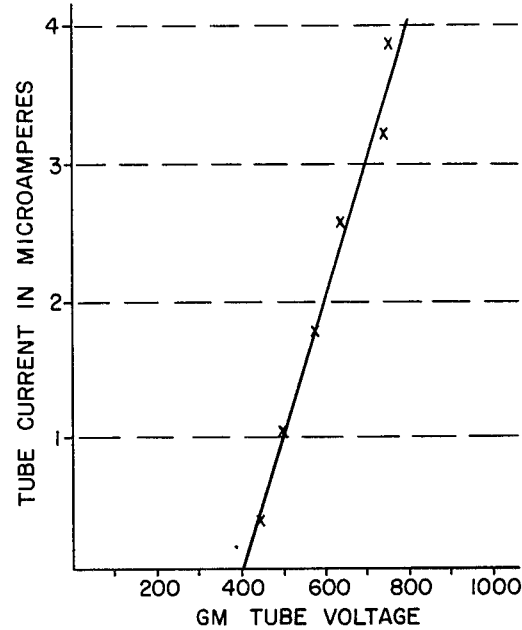
FIG. 2 is a graph of Geiger-Mueller tube voltage vs. current when operating in the charge collection mode.
Figure 3:
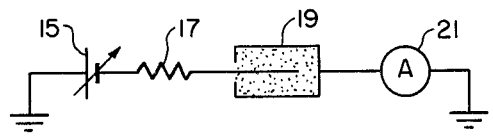
FIG. 3 is a circuit diagram showing how the graph of FIG. 2 was obtained.

FIG. 2 shows the current vs. voltage response of the aforementioned GM tube used in the dose rate meter of this invention when subjected to a fixed dose rate of 1.0 rad/hr. The circuit used for obtaining this curve is shown in FIG. 3 and includes an adjustable voltage source 15, a current limiting resistor 17 which was 2.2 megohms, GM tube 19 and microammeter 21. This curve shows that the GM tube current output is strongly dependent on the applied voltage and thus points up the necessity of providing a stable, regulated high voltage source if accurate dose rate readings are to be obtained. Such a power supply is provided by the use of the Zener diode voltage regulator 43 plus the large filter capacitor 41 shown in FIG. 6.

Figure 5:
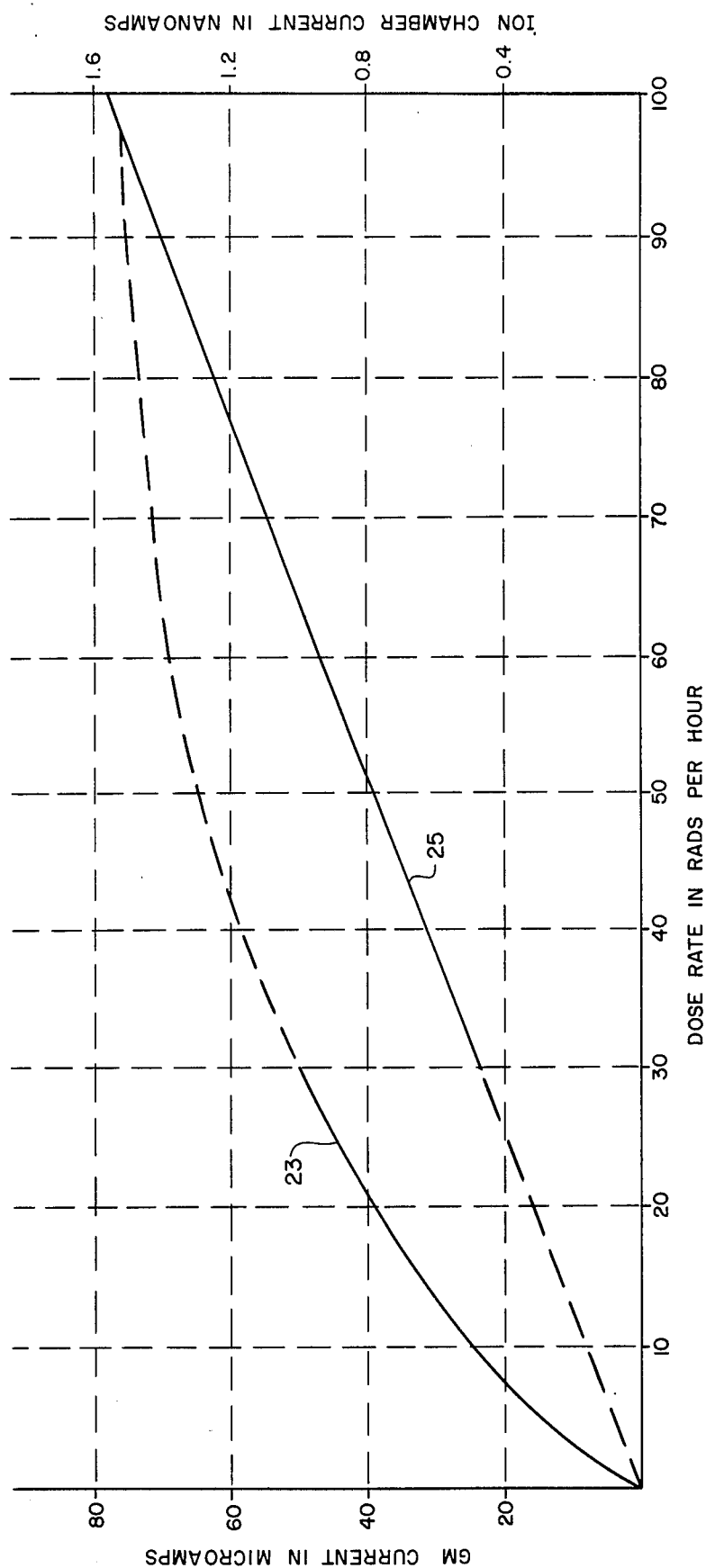
FIG. 5 shows the dose rate vs. current for a GM tube and a 160 cc ion chamber.

The graph of FIG. 5 shows the response of the hybrid radiation detector of the present invention to Cs 137 gamma rays with 500 volts applied to both detectors. The curve 23 and the left hand ordinate show the GM tube response and the straight line 25 and the right hand ordinate the response of the 160 cc ion chamber. It can be seen that the GM tube is a much more sensitive device than the ion chamber, producing approximately 50.microamps at 30.rads/hr. vs. approximately 0.45 nanoamps for the ion chamber at the same dose rate. It can be seen that the GM tube starts to saturate at about 80.rads/hr. and its incremental sensitivity or slope is rather low above 30.rads/hr. Also the inherent linearity and insensitivity of the ion chamber makes it a good detector for high dose rates up to about 1 million rads/hr. As stated above, the GM tube is utilized for dose rates below 30 rads/hr., where it is fairly linear and the ion chamber for higher dose rates. As a practical matter, dose rates of over 10,000 rads/hr. will almost always be fatal after a short time and thus this would represent the highest dose rate range measured by this instrument.

The curves of FIG. 5 together with the known time interval of 0.61 seconds during which the radiation detectors apply their outputs to the selected storage capacitor can be used to select the sizes of the capacitors C1–C10 for any given dose rate range. The detector current at a given dose rate from FIG. 5, multiplied by 0.61 seconds yields the electric charge output, Q, of the detector and this charge must be sufficient to charge the storage capacitor corresponding to that dose rate range to the full scale voltage of the electrometer, which for the electrometer used in the aforementioned prototype was 115 volts. The required capacity, C, is obtained from the well known relation $C=Q/V$.

Figure 4:
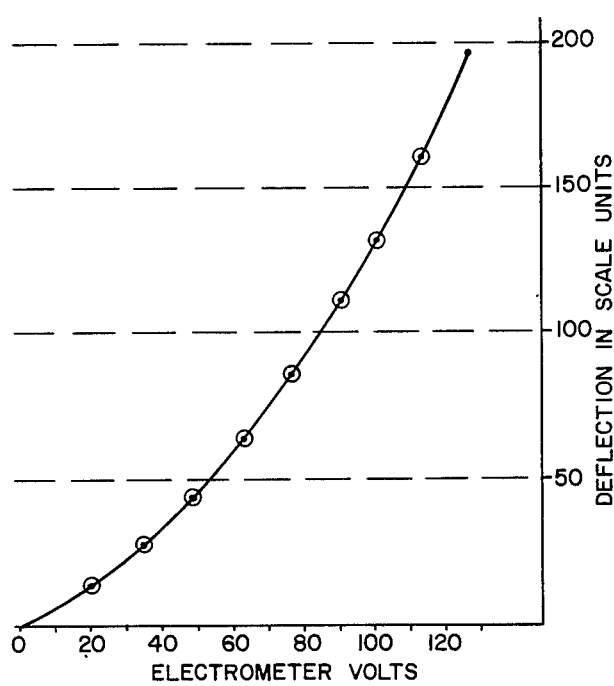
FIG. 4 shows the response of a quartz fiber electrometer.
Figure 8:
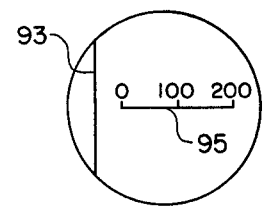
FIG. 8 shows the scale and the indicator hairline of the electrometer.

The curve of FIG. 4 shows the response of the quartz fiber electrometer of the present invention. This response is parabolic, however it can be seen that the region above 50 volts it is substantially linear, and in accordance with one feature of this invention the electrometer was converted to a suppressed zero instrument so that the linear scale thereof would be entirely in this substantially linear region. FIG. 8 shows the 0–200 scale 95 of this converted electrometer with the hairline 93 off-scale to the left with zero applied voltage. A conventional electrometer can be used and the non-linearity thereof taken into account in calibration curves.

The recorded reading will remain as voltages on the selected one of the storage capacitors C1–C10 for several minutes or more if the instrument is not in a strong radiation field. If it is in such a strong field, the disconnected and charged electrometer forms an ion chamber which can be internally discharged by a strong ambient field. This would reduce the recorded reading. This problem was alleviated by compensating for the lost charge by connecting a wire 74 from the high voltage supply to the vicinity of the electrometer lead, but not connected to it, as shown in FIG. 6. The voltage on wire 74 being more positive than the electrometer fiber, generates an ion current opposite to the electrometer discharge current. The position of the bare wire 74 is adjusted by bending it into such a position that the recorded reading remains approximately constant even in an intense ambient radiation field.

Modifications of the illustrated embodiment are possible, for example the number of storage capacitors C1–C10 may be made more or less than 10, a solid state timing device can be substituted for the relay type timer, or the high voltage supply may be made more or less than 500 volts; accordingly the invention should be limited only be the scope of the appended claims.

I claim:

1. A handheld dosimeter for civil defense use comprising:
  a hand-cranked generator;
  radiation detector means including a first Geiger-Mueller tube detector and a second ion tube detector;
  first switching means for selectively connecting the output of said generator to one of said first and second detectors;
  timing circuit means energized by said generator for providing a precise predetermined sampling interval;
  an electrometer connected to said timing circuit means;
  second switching means for selectively connecting the output of said first and second detectors to said electrometer and timing circuit means to selectively energize said electrometer;
  a plurality of storage capacitors selectively coupled in parallel with said electrometer for receiving the charge accumulated thereon and selecting the sensitivity ranges of said detectors; and
  means for compensating for the internal discharge of said storage capacitors through said electrometer including a wire connected to said high voltage circuit and extending to the vicinity of said electrometer;
  said dosimeter having three modes of operation, the first mode being a charge and continuous counting mode in which the output of said Geiger-Mueller tube is continuously applied via said second switching means to said electrometer, the second mode being a high sensitivity dose rate measuring mode in which the output of said Geiger-Mueller tube is applied via said second switching means to said electrometer and to said plurality of storage capacitors, and the third mode being a low sensitivity dose rate measuring mode in which the output of said ion chamber is applied via said second switching means to said electrometer and to said plurality of storage capacitors.

2. The device of claim 1 further including:
  a step-up transformer having primary and secondary windings, said primary windings being connected to the output of said hand-cranked generator;
  a high voltage multiplying and rectifying circuit connected to said secondary windings, the output of said high voltage multiplying and rectifying circuit being selectively applied via said first switching means to said Geiger-Mueller tube and to said ion chamber,
  said timing circuit further including a low voltage multiplying and rectifying circuit connected to said secondary windings and a reed switch being adapted to be closed for said predetermined sampling interval by said low voltage circuit, said reed switch being connected between the output of said radiation detector means and said electrometer to apply the output of said radiation detector means to said electrometer for said predetermined sampling interval.

3. The device of claim 1 wherein said Geiger-Mueller tube is used in both said charge and continuous counting modes and said high sensitivity mode for measuring dose rates below 30.0 rads/hr. and said ion chamber is used in the low sensitivity mode for measuring dose rates from 30.0 rads/hr to 10,000 rads/hr.

4. The device of claim 1 including a bleeder resistor selectively connected in parallel with said electrometer, said bleeder resistor being connected in parallel with said electrometer during said charge and continuous counting mode and being disconnected during both said high sensitivity dose rate measuring mode and said low sensitivity does rate measuring mode.

5. The device recited in claim 1 wherein said electrometer includes an indicator, and a light source energized by said generator and arranged to illuminate said indicator.

6. The device recited in claim 1 wherein said first and second switching means includes a ganged three-position switch.

7. The device recited in claim 1 wherein said first and second switching means are cooperatively arranged to be simultaneously activated.

* * * * *